(12) United States Patent
Nesreddine et al.

(10) Patent No.: US 11,993,858 B2
(45) Date of Patent: May 28, 2024

(54) SYSTEM AND METHOD FOR STORING AND GENERATING ELECTRICITY

(71) Applicant: HYDRO-QUÉBEC, Montréal (CA)

(72) Inventors: Hakim Nesreddine, Trois-Rivières (CA); Georges Houlachi, Pointe Claire (CA); Tom Marynowski, Trois-Rivières (CA); Claude Villemure, Trois-Rivières (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 17/924,888

(22) PCT Filed: May 11, 2021

(86) PCT No.: PCT/CA2021/050656
§ 371 (c)(1),
(2) Date: Nov. 11, 2022

(87) PCT Pub. No.: WO2021/237338
PCT Pub. Date: Dec. 2, 2021

(65) Prior Publication Data
US 2023/0203690 A1     Jun. 29, 2023

(30) Foreign Application Priority Data

May 14, 2020  (CA) .................................. CA 3080734

(51) Int. Cl.
*C25C 5/02*   (2006.01)
*C25C 1/06*   (2006.01)
(Continued)

(52) U.S. Cl.
CPC ................. *C25C 5/02* (2013.01); *C25C 1/06* (2013.01); *F22B 1/00* (2013.01); *F23B 99/00* (2013.01);
(Continued)

(58) Field of Classification Search
CPC .... C25C 5/02; C25C 1/06; C25C 7/04; C25C 7/08; F22B 1/00; F22B 1/183;
(Continued)

(56) References Cited

U.S. PATENT DOCUMENTS 8,739,512 B2 *   6/2014   Mills .......................... F22B 3/04
                                                          60/39.5
2010/0176602 A1 *   7/2010   Shinnar ..................... F03G 6/04
                                                          290/1 A (Continued)

FOREIGN PATENT DOCUMENTS

CA           2717887 C      6/2016
DE     10 2009 043 169 A1    3/2011

OTHER PUBLICATIONS

E.Mostad et al., "Electrowinning of iron from sulphate solutions," Hydrometallurgy, vol. 90 (2008), pp. 213-220.
(Continued)

*Primary Examiner* — Hoang M Nguyen
(74) *Attorney, Agent, or Firm* — IceMiller LLP

(57) ABSTRACT

Various configurations of a power plant are described. The power plant is configured to supply power to a receiving electrical grid by the combustion of metal powder. The power plant is also configured absorb power by recovering the metal powder from the metal oxide produced by the combustion of the metal powder, with electricity from a source electrical grid.

20 Claims, 7 Drawing Sheets

(51) Int. Cl.
*F22B 1/00* (2006.01)
*F23B 99/00* (2006.01)
*F23C 10/00* (2006.01)
*F27B 15/02* (2006.01)
*H02J 3/28* (2006.01)
*H02J 15/00* (2006.01)

(52) U.S. Cl.
CPC ............ *F23C 10/002* (2013.01); *F27B 15/02* (2013.01); *H02J 3/28* (2013.01); *H02J 15/00* (2013.01); *F23B 2900/00003* (2013.01)

(58) Field of Classification Search
CPC ............ F23B 99/00; F23B 2900/00003; F23C 10/002; F23C 99/00; F27B 15/02; H02J 3/28; H02J 15/00; F05D 2220/76; F01D 15/10; F01D 15/00; F23D 1/00; Y02P 10/25
See application file for complete search history.

(56) References Cited

U.S. PATENT DOCUMENTS

2011/0089045 A1 4/2011 Cardarelli
2014/0331670 A1* 11/2014 Zarisfi .................. H02J 15/003
60/639

OTHER PUBLICATIONS

J.M Bergthorson, et al., "Direct Combustion of Recyclable Metal Fuels for Zero-Carbon Heat and Power," Applied Energy, vol. 160, 2015, pp. 368-382.
Francois-David Tang, et al., "Modes of Particle Combustion in Iron Dust Flames," Proceedings of the Combustion Institute, vol. 33, 2011, pp. 1975-1982.
Luc Dirven, et al., "Dense Energy Carrier Assessment of Four Combustible Metal Powders," Sustainable Energy Technologies and Assessments, vol. 30, 2018, pp. 52-58.
Henrik Wiinikka, et al., "Pulverized Sponge Iron, a Zero-Carbon and Clean Substitute for Fossil Coal in Energy Applications," Energy Fuels, Aug. 2018.
Jeffrey M. Bergthorson, "Recyclable Metal Fuels for Clean and Compact Zero-Carbon Power," Progress in Energy and Combustion Science, vol. 68, 2018, pp. 169-196.
Sam Koohi-Kamali, et al., "Emergence of Energy Storage Technologies as the Solution for Reliable Operation of Smart Power Systems: A Review," Renewable and Sustainable Energy Reviews, vol. 25, Sep. 2013, pp. 135-165 (Abstract Only).
M.R. Hulsbos, et al., "Metal Energy Carriers: Renewable Fuels of the Future," International Workshop on Clean Combustion: Principles and Applications, Darmstadt, Germany, Sep. 25-26, 2019.
Philippe Julien, et al., "Enabling the Metal Fuel Economy: Green Recycling of Metal Fuels," Royal Society of Chemistry, Sustainable Energy Fuels, vol. 1, 2017.
Jin-yun Wang, et al., "Research Progress of Metal Fuel Motor Technology," International Journal of Metallurgy and Metal Physics, 2020, 5:056, pp. 1-13.

* cited by examiner

SYSTEM AND METHOD FOR STORING AND GENERATING ELECTRICITY

CROSS-REFERENCE TO RELATED APPLICATIONS

This application is a National Stage of International Patent Application No. PCT/CA2021/050656, filed on May 11, 2021, which claims priority to Canadian Patent Application No. 3,080,734, filed on May 14, 2020, the disclosures of which are incorporated by reference in their entireties.

FIELD

The present disclosure concerns a system and a process for electricity production and storage. More specifically, it describes a power plant configured to absorb, convert, store, and return electricity of an electrical grid by using a metal energy vector.

BACKGROUND

Sources of power and energy traditionally come from hydro-electric, gas, coal, nuclear plants, as well as wind power plants, photovoltaic plants, etc. These sources have the particularity of generating electricity by transforming an external energy source. Complementary sources that absorb electric energy from the electrical grid can be added thereafter to return power at the appropriate time. These sources are typically batteries, flywheels, and pumped storage. There are, however, certain limitations with these complementary sources. For instance, pumped-storage has the same geographic and environmental issues as hydro-electric plants. Another example is battery technology, which is limited in storing energy. There is therefore room for improvement.

SUMMARY

According to an aspect, a power plant is described. The plant is configured to operate in a first mode wherein it supplies power to a receiving electrical grid, and in a second mode wherein it absorbs power from a source electrical grid. The plant is characterized in that: in said first mode, the plant is configured to produce electricity using metal powder as fuel; and in said second mode, the plant is configured to store energy by using the electricity from the source electrical grid to recover the metal powder from metal oxide.

According to an aspect, a method of storing and producing electricity is described. The method comprises the following steps: absorbing energy from a source electrical grid by using the electricity of the source electrical grid to recover metal powder from metal oxide; producing energy by using the recovered metal powder as fuel; and supplying the produced energy to a receiving electrical grid.

According to an aspect, a system for storing and producing electricity by means of metal powder is described. The system comprises: a power production module connected to a receiving electrical grid, the power production module being configured to produce electricity and metal oxide by the combustion of metal powder, and to supply the produced electricity to the receiving electrical grid; and a metal powder production module connected to a source electrical grid, the metal powder production module being configured to absorb electricity by recovering the metal powder from the metal oxide with electricity from the source electrical grid.

According to an aspect, a power plant is described. The plant is configured to supply electricity to a receiving electrical grid by the combustion of metal powder, and to absorb energy by recovering, using electricity from a source electrical grid, the metal powder from metal oxide produced by the combustion of the metal powder.

According to an aspect, a method of electricity storage and production is described. The method comprises the following steps: producing metal powder at a first sub-site by using the electricity of a source electrical grid; and transporting the metal powder to a second sub-site in order for the metal powder to be used as fuel to produce electricity to support a receiving electrical grid.

According to an aspect, a system for storing and producing electricity by means of metal powder is described. The system includes: a power production module connected to a receiving electrical grid, the power production module being configured to produce electricity and metal oxide by the combustion of metal powder, and to provide the produced electricity to the receiving electrical grid; and a metallic powder production module connected to a source electrical grid, the metallic powder production module being configured to absorb electricity by recovering the metallic powder from metal oxide using electricity from the source electrical grid.

According to an aspect, a power plant is described. The power plant is configured to provide electricity to a receiving electrical grid by the combustion of metallic powder, and configured to absorb energy by recovering, using electricity from a source electrical grid, the metallic powder from the metal oxide produces by the combustion of the metallic powder.

According to an aspect, a method of electricity storage and production is described. The method comprises the following steps: producing electricity at a first sub-site by the combustion of metal powder; supplying the produced electricity to a receiving electrical grid; and transporting metal oxide produced by the combustion of the metal powder to a second sub-site, in order for the metal to be recovered as metal powder with the electricity of a source electrical grid.

According to an aspect, a method of electricity storage and production is described. The method comprises the following steps: producing metal powder on a site by using electricity from a source electrical grid; and producing electricity on the same site to support a receiving electrical grid, by using the metal powder as fuel.

Other objects, advantages, aspects and features of the invention will become clearer and will be better understood in view of the non-limiting description of the invention, and through to the figures in the application.

DETAILED DESCRIPTION

Figure 1:
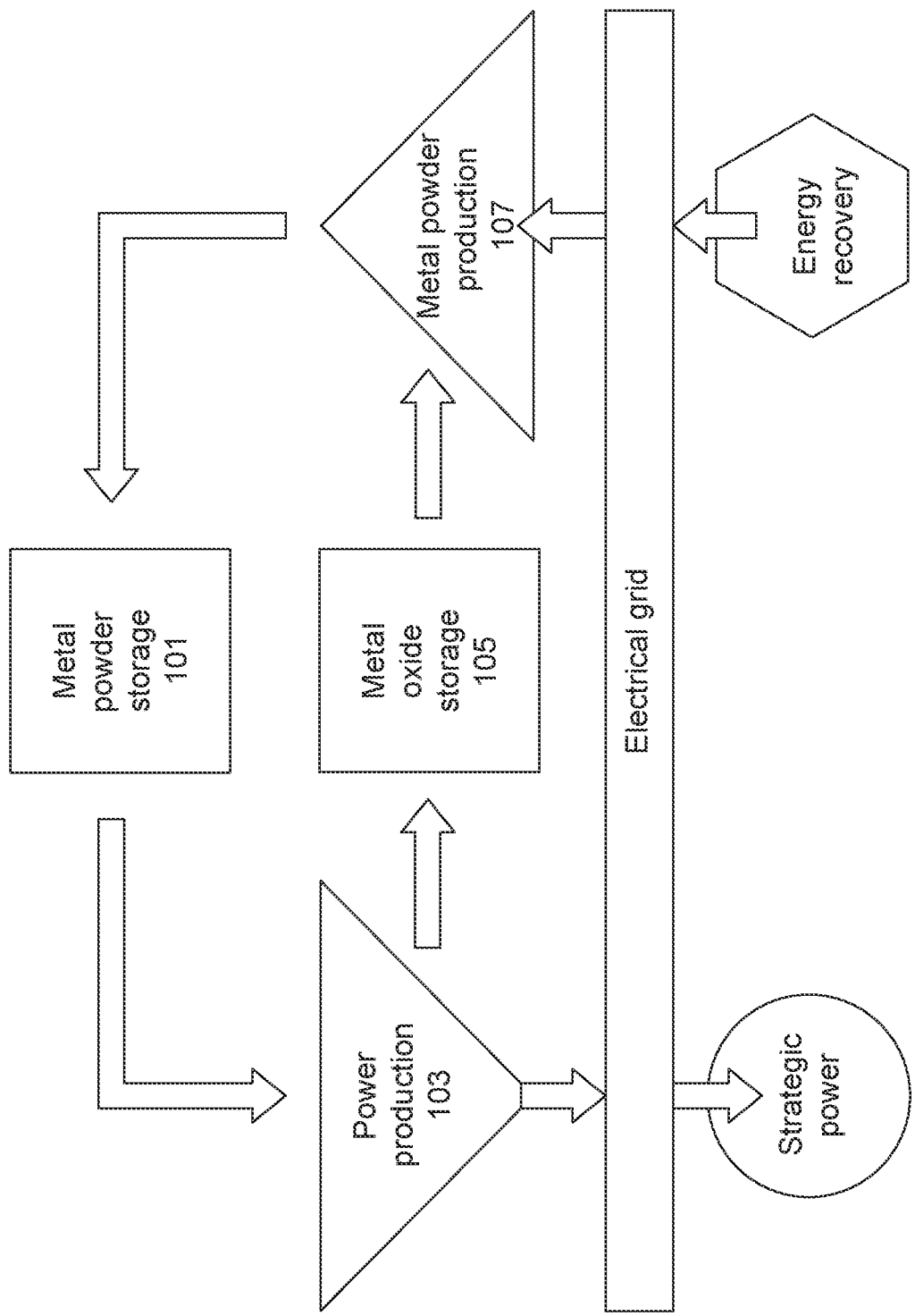
FIG. 1 is a schematic of an energy storage and production system, according to an embodiment.

With reference to FIG. 1, a system 100 for electrical storage and production is schematically illustrated according to an embodiment. Generally described, the system 100 allows storing energy as a metal powder and to thereafter produce electrical power when desired by combustion of the metal powder. The system therefore behaves both as an electrical source and as an electrical load.

In the illustrated embodiment, the system 100 comprises a first storage module 101 and a second storage module 105, a power production module 103, and a metal powder production module 107. The metal powder production module 107 allows storing energy by using electricity to transform metal oxide into metal powder. The power production module 103 thereafter allows producing an electrical power at the desired time from the combustion of the metal powder.

The storage modules 101 and 105 allow storing the metal powder from the metal oxide as an intermediary between the power production module 103 and the metal powder production module 107. For instance, the first storage module 101 can be used to store metal powder produced by the metal powder production module 107 for an indeterminate period before it is used as fuel in the power production module 103. Similarly, the second storage module 105 can be used to store metal oxide created by the combustion of the metal powder in the power production module 103 for an indeterminate period, before it is provided to the metal powder production module 107 to be recovered as metal powder.

Figure 2:
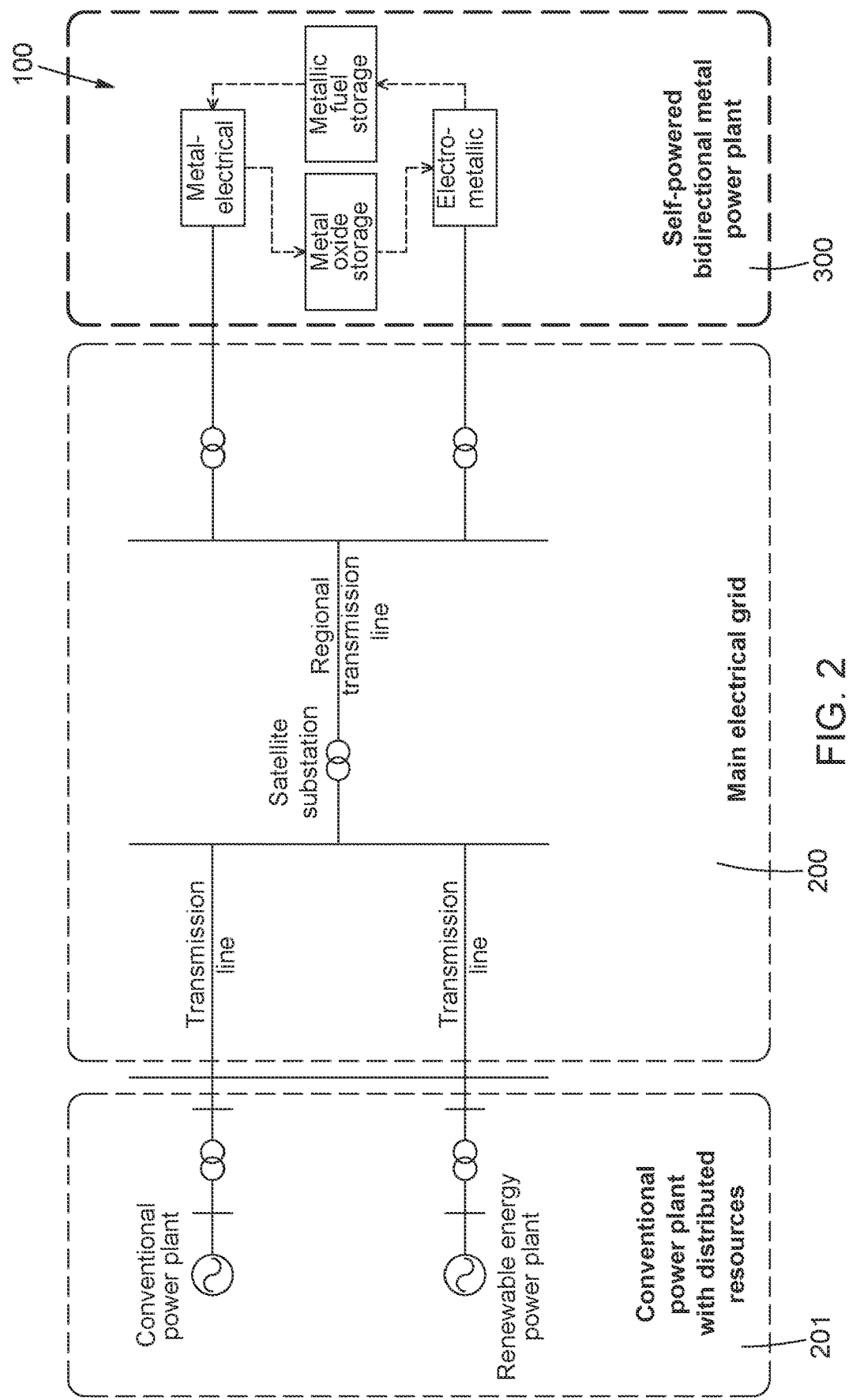
FIG. 2 is a schematic showing the system of FIG. 1 connected to an electrical grid and acting as a power plant.

In a preferred embodiment, as illustrated in FIG. 2, the system 100 can be connected to an electrical grid 200 supplied by conventional power plants. These conventional power plants can comprise exclusively non-variable production plants (for instance hydro-electric plants), exclusively variable production plants, or a combination of both. It is appreciated that the conventional power plants can be coupled to distributed energy resources 201. In such a configuration, the system can operate as an electrical plant 300 configured to absorb, convert, store, and return electricity from the electrical grid 200. As an example, during a high energy demand period on the electrical grid 200 (e.g., following a determination that there is a high demand or an energy insufficiency in the grid, and/or that it would be more profitable to store energy rather than produce it), the plant 300 can be operated in a first mode in which additional electricity is produced by the combustion of the metal powder to support the grid. During a low energy demand period on the electrical grid 200 (e.g., following a determination that there is a low demand or an energy surplus in the grid, and/or that it would be more profitable to produce and provide energy rather than store it), the plant 300 can be operated in a second mode in which surplus electricity is stored to by the recovering of the metal powders. In this fashion, the power plant 300 can act as a complementary plant that uses energy stored when there is a surplus to complete the main energy production in an electrical grid when it is insufficient (e.g., when the energy produced by a non-variable energy source is insufficient to satisfy needs that can vary in a seasonal or temporal manner). The plant 300 can also be operated in a third mode in which it is at rest and neither produces nor absorbs energy, and/or in a fourth mode in which it is used as a rotating machine to provide grid services complementary to the electrical grid 200.

As can be appreciated, the power plant 300 differs from traditional electricity storage systems at least in part because of the fact that it uses metal powder as an energy vector, a fuel, and a storage medium. Power plant 300 can thus be referred to as a metal power plant. The power plant 300 can implement many processes related to the reduction of metal oxide as metal fuel, their storage, and their conveying, as well as any process related to metal combustion and the storage and conveying of the metal oxide produced as a result. As will described in more detail below, the plant 300 can comprise several modules and components. These can be divided among many sub-sites that are all a part of plant 300. For instance, there can be a metal powder production sub-site, an electricity production sub-site and metal powder and/or oxide storage sub-sites. These sub-sites can be interconnected with continuous supply means such as conveyors or other means of transport. In some embodiments, the sub-sites are located near one another, for instance on the same site and within a maximal distance of 100 km or even 50 km. It can also be understood that in some embodiments, the sub-sites can all be connected to a same electrical grid. In other embodiments, the sub-sites, modules and/or components can be located at different sites, for instance at sites that are distant but in a same region, or at sites located in two different regions or territories, at sites spaced apart by a distance greater than 50 km or preferably 100 km, and/or at sites connected to different electrical grids.

Figure 3:
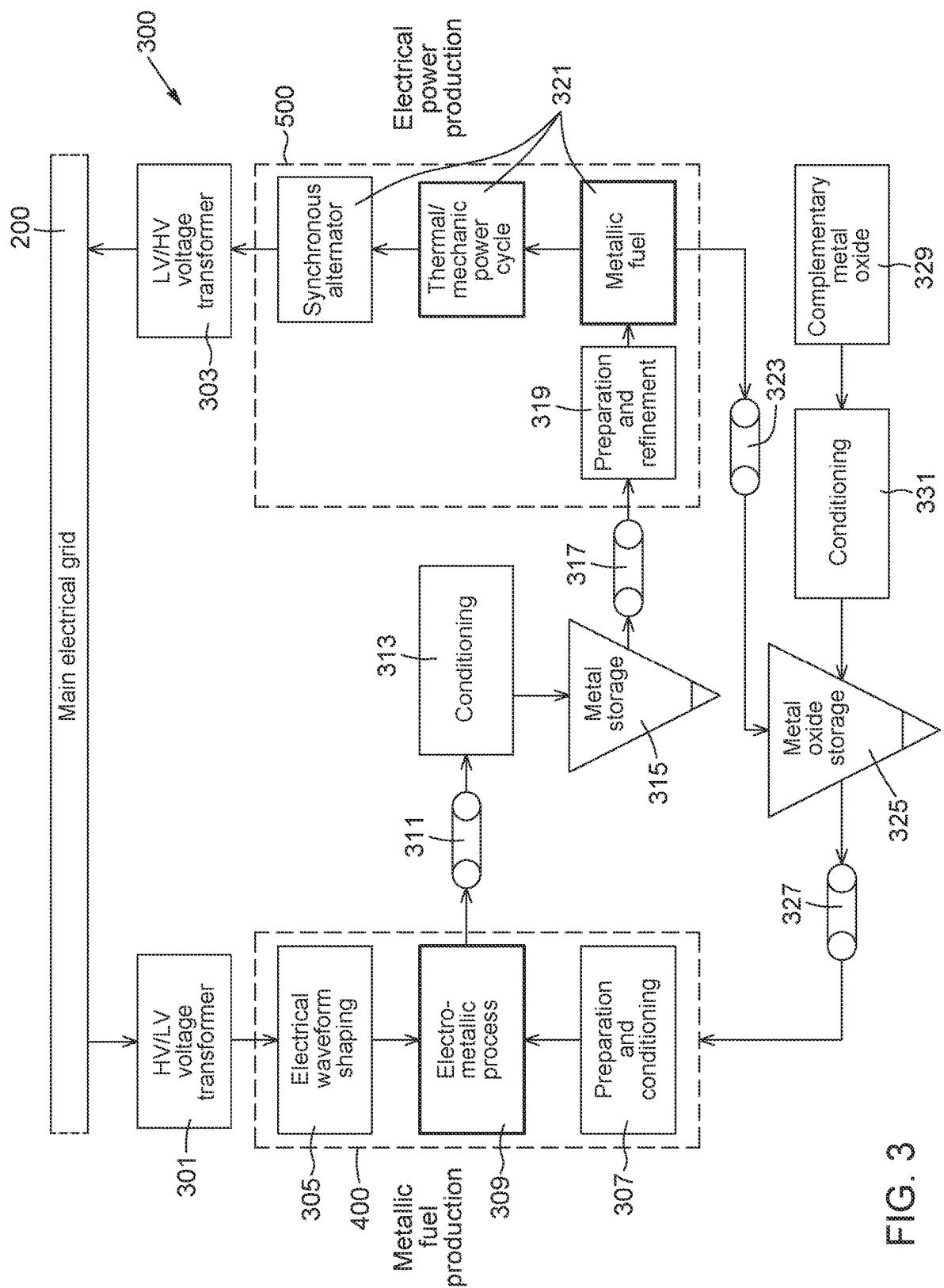
FIG. 3 is a schematic of a metal power plant, according to an embodiment.

With reference to FIG. 3, a metal power plant 300 is illustrated according to a preferred embodiment. In the present embodiment, plant 300 is interconnected to an electrical grid 200 corresponding to a three-phase main power network. As can be appreciated, the modules and components of metal power plant 300 can operate at a voltage lesser than a voltage of electrical grid 200 which is used to transport electricity over a great distance. Electrical grid 200 can therefore be described as operating at high voltage (HV), whereas metal power plant 300 is operated at low voltage (LV). It is appreciated, however, that the terms "high" and "low" are relative terms, and that the values of HV and LV can vary from one case to another. In view of differences in voltage, the interconnection between plant 300 and electrical grid 200 comprises one or many transformer modules. For instance, in the present embodiment, the interconnection comprises an HV/LV transformer module 301 to draw current from the electrical grid 200 (source electrical grid) and an LV/HV transformer module 303 to inject current into electrical grid 200 (receiving electrical grid). Each of the transformer modules 301 and 303 can comprise their own voltage transformers or can alternatively use the same transformers according to the operation mode of plant 300. While two transformer modules 301 and 303 were described in relation with the present embodiment, it is appreciated that a single bidirectional transformer module can be provided in other embodiments. The transformer module can be a classic voltage/current transformer as well as a set that contains power conversion technologies of the rectifier and inverter type and any ancillary equipment.

While in the present embodiment, the plant 300 is connected to a single electrical grid 200 acting as source electrical grid and receiving electrical grid, it can be appreciated that in other embodiments, the plant 300 can be connected to two distinct electrical grids. For instance, the plant 300 can be located at the border of two electrical grids, and can be configured to absorb electricity from one electrical grid (source electrical grid) and to inject electricity into another electrical grid (receiving electrical grid).

As generally described above, the plant 300 is configured to absorb and store energy from the electrical grid 200 by the production/recovery of metal fuel. In the present embodiment, the plant 300 implements a metal fuel production process 400 that uses LV electricity from a HV/LV transformer module 301 to recover metal fuel from metal oxide stored in the plant 300.

The plant 300 can comprise several modules to implement the process 400, such as an electrical waveform shaping module 305, a metal oxide preparation and conditioning module 307, and a metal powder production module 309. In the present embodiment, the metal powder production module 309 is configured to produce metal fuel through an electrolytic process. The module 305 is therefore configured to condition the electrical feed from the HV/LV transformer module 301 for a use within an electrolysis process. Similarly, the module 307 is configured to prepare and/or condition the metal oxide in an appropriate means for a use within the framework of an electrolysis process. It should be noted that other configurations are possible. As an example, the transformer module 309 can be configured to produce the metal fuel through other means, such as a direct chemical reduction, for instance through hydrogen or through electrolysis in an alkaline medium. In such cases, the modules 305 and 307 can be configured to respectively condition the electrical waveform and the oxides according to what is required.

Figure 4:
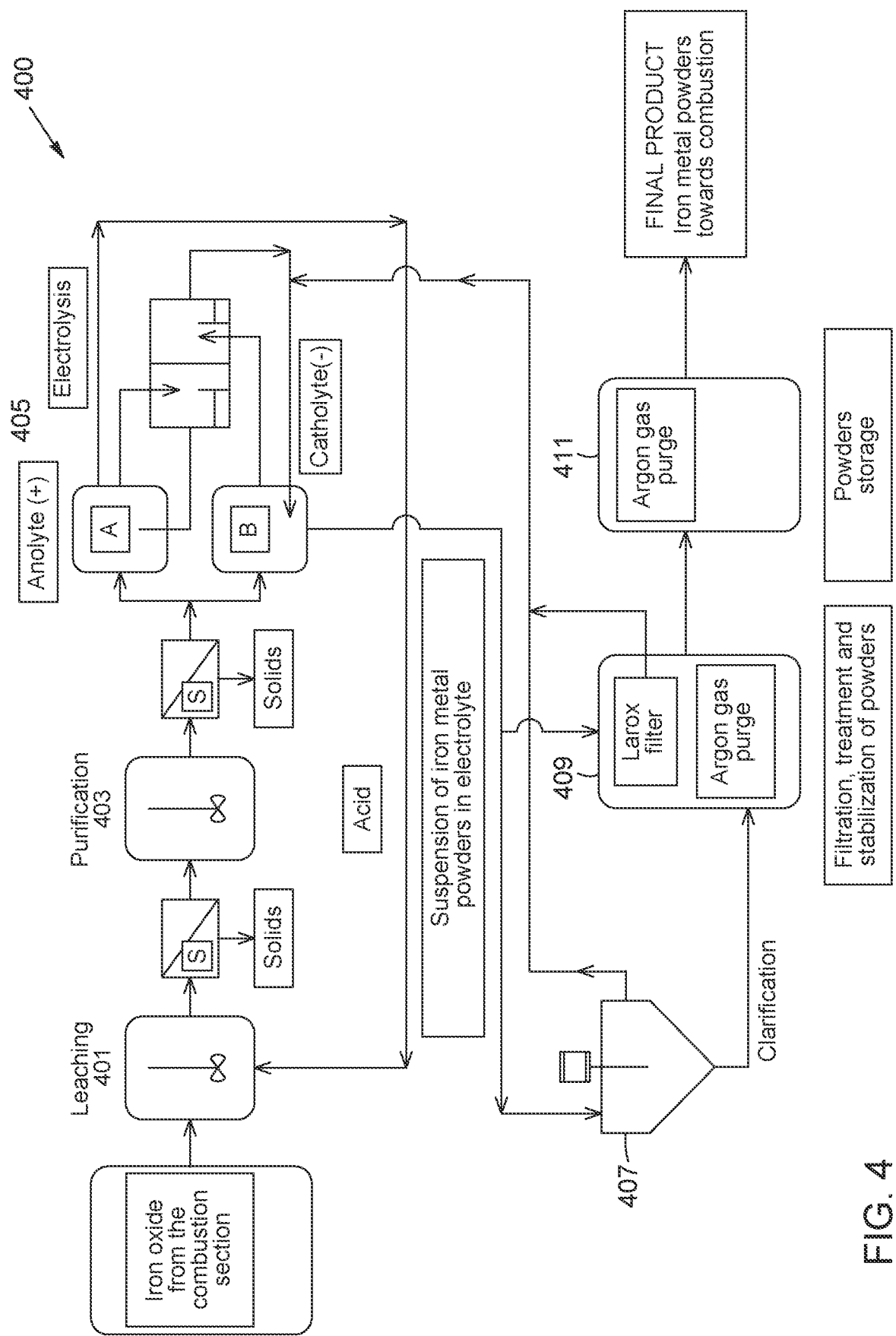
FIG. 4 is a schematic of a process of metallic fuel production, according to an embodiment.

With reference to FIG. 4, a metal fuel production process 400 is illustrated in more detail. In the illustrated embodiment, the process is configured to produce iron from iron oxide via the electrolysis process. The allows producing iron in powder form for use as a fuel. More specifically, the electrolysis conditions, such as the current and the overvoltage, can be adjusted to obtain different sizes of iron particles, for instance between 40 and 850 μm. It should be noted that while a process using iron is illustrated, different metals and corresponding oxides can be used in other embodiments.

The process 400 comprises a first leaching step 401 that allows transforming the iron oxide stored in solid form into a solution adapted for electrolysis. Described generally, the iron oxides produced during the combustion of iron powders are collected to feed leaching reservoirs. A mixing and a certain separation of agglomerates are performed to allow for an efficient dissolution of iron oxide in sulfuric acid.

As an example, in an embodiment, the leaching of iron oxides can be performed in three (3) leaching reservoirs containing sulfuric acid at a 50 g/L concentration. The solution temperature can be maintained at 40° C. and the mixing can be performed with hanging mixers. During leaching, iron oxide ($Fe_2O_3$) is dissolved and the iron in a ferric state can be reduced during the first hours of electrolysis by a reduction preconditioning before powder deposition.

Depending on the electrolyte purity, the solution can then be treated in a purification step 403 to remove undesirable impurities. As can be appreciated, the quantity of these impurities can be reduced if the metal oxides are pure or if the fuel has already undergone several combustion/recovering cycles.

During purification step 403 and depending on the type of impurities in the iron oxides, different purification treatment options can be used. The quantity and the type of impurity are mainly a result of the quality of the iron ore concentrate introduced in the process, and of the extraction site. As an example, in some embodiments, purification can involve using ion exchange resins or adjusting the pH to precipitate and remove the impurities.

The type of equipment required at this step depends on the impurities to remove. For instance, in some embodiments, two (2) 50 m³ reservoirs and a filter press (of the "plate-and-frame" type) can be provided.

Once the solution is purified, the solution is treated in an electrolysis step 405 to produce iron powders. The purified solution coming from the leaching process can be fed into electrolytic cells, where iron plates to the cathode, oxygen releases at the anode, and sulfuric acid is recovered at the anode. This acid can be recycled in the leaching step 401 to dissolve new iron oxides.

The reactions occurring in an electrolytic cell during iron deposit from a solution containing iron sulfate can be described as:

At the cathode:

$$Fe^{++} + 2e = Fe$$

$$H^+ + e = \tfrac{1}{2}H_2$$

$$Fe^{+++} + e = Fe^{++}$$

At the enode:

$$SO_4^{--} - 2e + H_2O = H_2SO_4 + \tfrac{1}{2}O_2$$

$$Fe^{++} - e = Fe^{+++}$$

For the iron deposit to be efficient, the iron should be deposited from its iron oxidation state. Nevertheless, at the anode, the ferrous ions can be oxidized to their ferric state, thereby affecting the global efficiency of the process. This can be worked around by having two independent flows of electrolytes: the cathode and the anode (A and B), separated by an anion-exchange membrane to prevent ferrous ions from passing into the anodic section chamber. The electrolyte can be circulated with a high electrolyte flow in the catholyte compartment to allow for easy removal of the iron powder loosely maintained at the surface of the cathode. As can be appreciated, the electrolysis parameters can be varied as needed. As an example, the current density at the electrodes can correspond to 1000 A/m², but other parameters are possible.

A next step 407 can consist in recovering the iron powders in the electrolysis section. As can be appreciated, the high electrolyte flow can allow removing the iron powders from the surface of the cathode. A settler can then be used to recover the metal powders formed on the cathode. This is a standard piece of equipment used in the hydrometallurgical sector. The powders are recovered at the bottom of the tank and the clear solution (overflow) can be recycled in the electrolysis section.

A next step 409 can consist in washing and filtering the underflow (metal powder sludge) of the settler. This allows removing the electrolytic solution from the metal powder sludge and to produce moist metal powders. It is noted that different filtration equipment can be used to that end, such as a filter press, with plates and with frames. In the present embodiment, a Larox filter is used, but it is appreciated that other types of filters can be used.

A final step 411 can consist in stabilizing or passivating the metal powders in preparation for storage. The goal of this step is to make the iron powder inert with respect to oxidation.

In some embodiments, the passivation step 411 can be performed while the iron powder is still in the filter press after filtration. As an example, a citric acid solution can be passed through the filter press as a stabilizing agent. As can be appreciated, other stabilizing agents are possible, but citric acid is preferable for environmental aspects and also for its chemical composition from carbon, hydrogen and oxygen which does not release heavy, toxic, or environmentally problematic elements when traces of acid subsist in the powders to be burnt after passivation. The passivation step 411 can also comprise drying the iron powders. Different drying equipment can be used, such as fluidized bed dryers, rotary kiln, or by pulverization. If passivation does not occur during pressing, it can also be performed or completed before drying.

Following stabilization, the iron powders are ready to be stored for an indefinite period in order to be eventually used as fuel to produce electricity when needed. In the current embodiment, the stabilized powder will be ready to be used directly in the electrical power production process that will be described below. Nevertheless, in other embodiments, additional steps can be performed in order to prepare the powders for combustion. For instance, when the iron powders produced by a main production process comprising the direct reduction of the oxides by hydrogen, the size of the iron particles can be progressively scaled down as they undergo complete cycles of the process (reduction/combustion). In such cases, an agglomeration step can be performed, for instance, to recover the initial physical/mechanical properties of the iron powders. It can be appreciated that any other step of metal powder that would bypass all or a part of the main production process can be performed. As an example, a part of the metal powders can be produced by an electrolysis process (or another production process) in parallel with the main production. As another example, the main production can be temporarily replaced with another process (such as an electrolysis process) for a certain period of time. In this fashion, it can be ensured that the particles have the optimal properties for combustion. For instance, an excessively small particle size can be avoided.

Returning to FIG. 3, the power plant 300 comprises a first transport means 311 to transport the metal powder during process 400 to a conditioning module 313 and a first storage module 315. As can be appreciated, the transport means 311 can comprise any type of equipment that allows for handling and conveying in a manner that is compatible with security measures applicable to metal powders. In the present embodiment, the transport means 311 comprises belt conveyors to convey the powders, and a stacker-reclaimer to handle the powders. Nonetheless, other devices as possible, such as screw augers, bucket conveyors, vacuum conveyors, pneumatic conveyors, compressed gas conveyors, trucks, other vehicles, etc.

In the present embodiment, the powders from the metal powder production module 313 are conveyed to a conditioning module 313. The conditioning module 313 is configured to prepare the powders such that they can be used in a combustion process, such as the one that will be described in more details below. The conditioning module 313 can comprise various equipment to carry this out, such as equipment that allows crumbling and/or sieving the powders in order for the powder to have a homogeneous particle size. The conditioned powders can then be conveyed to the first storage module 315.

The first storage module 315 allows storing the metal powders for an indefinite duration. In the present embodiment, the first storage module 315 comprises one or many silos that allow stacking a large volume of powders. The silos can, for instance, have a longitudinal or vertical design to facilitate extension and accommodate future needs. Inside the silos, a stacker-reclaimer can be provided to allow for the handling of the powders. It can be understood, nonetheless, that other mechanisms can be provided to store and/or handle the powders. As an example, the storage module can comprise a hangar, and/or any storage site configured to handle the powders and store them for a prolonged period.

As can be appreciated, the metal powders can be very reactive, which makes them vulnerable to deterioration (for instance, by oxidation of the iron powders) and which poses an important risk of fire. Accordingly, in a preferred embodiment, the powders are handled and stored in a safe manner and in a manner that prevents deterioration. As an example, for the handling and storage steps, the atmosphere can be partially or entirely enriched with an inert gas such as argon or nitrogen. This atmosphere can also be controlled in terms or temperature, humidity and/or pressure such that the atmosphere in the storage module has a pressure less than or greater than the ambient atmospheric pressure. Thus, the metal oxide oxidation, degradation and fire risks are reduced. Other safety measures can also be taken, such as equipment grounding, temperature sensors and certified equipment for explosive environments.

In some embodiments, the storage silo can be configured to be resistant to contamination by humidity and oxygen input, and to control hydrogen generation, among others. As an example, the silo can be made airtight to reduce humidity and oxygen input. Hydrogen generation can be controlled with fixed or controllable vents in key positions. It should be noted that other measures can be taken to control the environment inside the silo, if needed.

When the power plant 300 is in electricity production mode, a second transport means 317 can be used to handle and transport the metal powder to the power production module 321. As can be appreciated, the second transport means 317 can comprise mechanisms similar to first transport means 311, such as a reclaimer that allows reclaiming the metal powder from the storage silo and a belt conveyor that allows transporting the powder. Although not illustrated, it is appreciated that in some embodiments, the powder can be transported to a temporary silo separated from the long-term storage silo. The temporary silo can be used to directly feed the power production module 321.

As generally described above, the power plant 300 is configured to produce electricity by the combustion of metal powders. In the present embodiment, the plant 300 implements an electricity production process 500 that uses the fuel stored in storage module 313 (the fuel that was produced by process 400) to produce electricity and metal oxides as a by-product. The produced electricity is provided to the LV/HV transformer module 303 to be converted to the voltage required to support the electrical grid 200, and the metal oxides are stored in the plant 300 to be reused in the fuel production process 400 when the plant 300 again operates in an energy absorption mode.

The power plant 300 can comprise several modules to implement the electricity production process 500, such as a preparation and refinement module 319 and a power production module 321. As will be described in more detail below, the preparation module 319 can be used to prepare the powders such that they can be burned in an optimal manner. The power production module 321 can be used to burn the metal powder to feed various types of generators that implement various types of electricity production cycles. As an example, in the present embodiment, the production module is configured to feed a working fluid from the metal powder combustion heat to drive a turbo generator unit. More specifically, the electricity production cycle used is a cycle wherein the combustion of metal powder creates water steam to drive a steam turbine and to produce electricity. It should be noted that other electricity-producing heat-based engines or heat-power conversion equipment can be used, such as an external combustion gas turbine, etc. It should be noted as well that various types of generators and corresponding cycles can be used as a function of the power requirements of plant 300. In particular, in some embodiments, the hot air Brayton cycle or the organic Rankine cycle (ORC) can be used.

Figure 5:
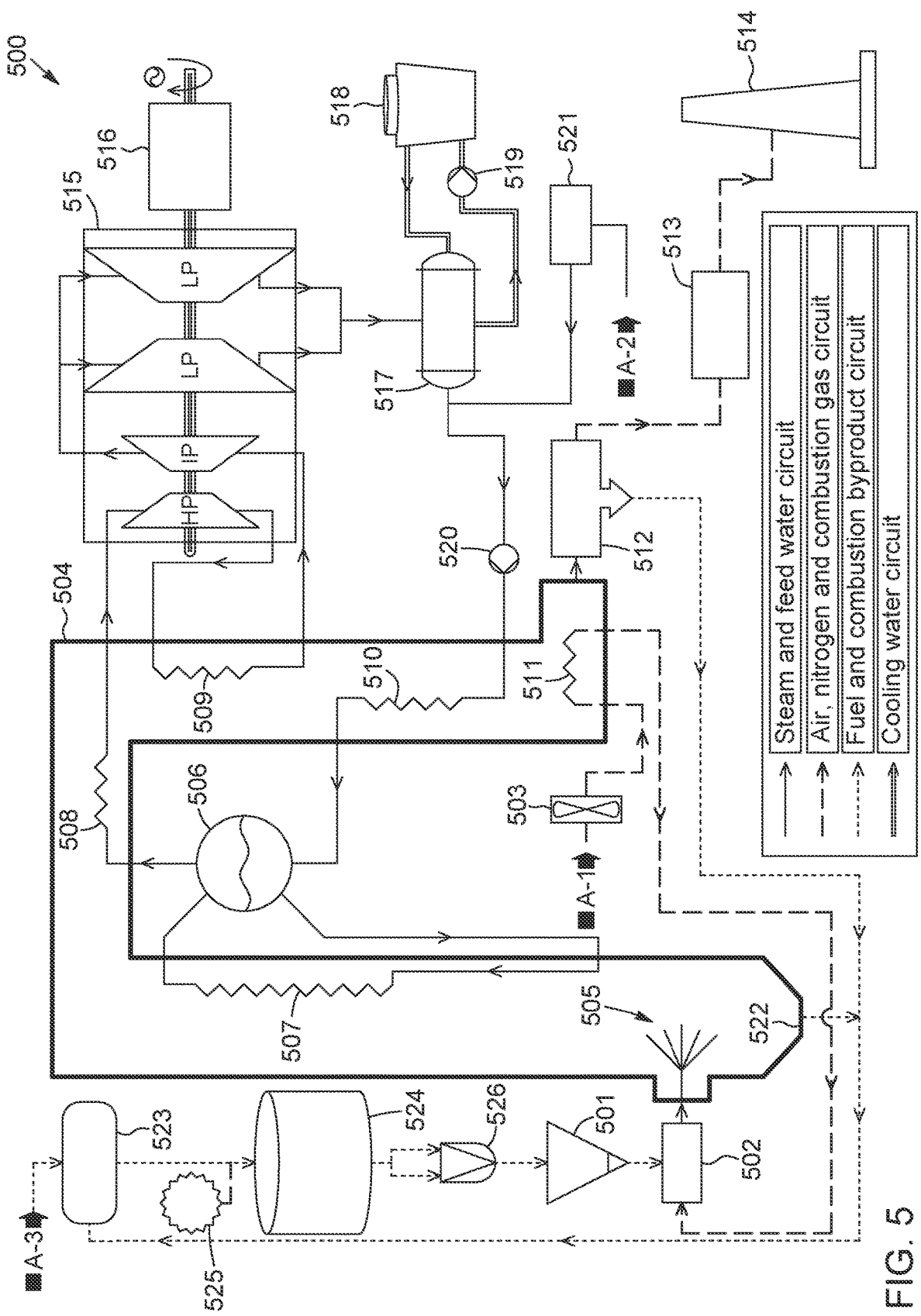
FIG. 5 is a schematic of a process for production of electricity by metal combustion, according to an embodiment.

With reference to FIG. 5, an electricity production process 500 through metal combustion is illustrated in more detail according to an embodiment. First, the fuel (iron powder) provided from a feeding silo 1 is mixed in a pulverizer 2 with ambient air A-1 propelled by a higher-pressure fan 3. The preheated mix is introduced into a boiler 4 via a burner 5. In the present embodiment, the metal powders can have a granulometric distribution between 1 μm and 350 μm with atmospheric air as an oxidizing agent. Nevertheless, the particulate size can be raised when using oxidizing agents that are richer in oxygen.

The combustion thermal energy is used to convert water into steam at a high temperature and pressure. Steel tubes run along the sides of the boiler in which the water converted to steam is collected in a collector 6. Boiler combustion gases go through a steam generator 7, a superheater 8, a heater 9, an economizer 10 and an air preheater 11. Thereafter, the gases go through an electrostatic filter 12 and a gas treatment facility 13 and end up being released into the atmosphere through a chimney 14.

The high-pressure superheated steam drives the various pressure chambers of a steam turbine 15 coupled to an alternator 16, which causes the rotation of its blades. The steam energy is converted into mechanical energy in the steam turbine acting as a main engine. The steam pressure and temperature fall to a lesser value, and the steam volume increases at it goes through the turbine. The steam output at low pressure is evacuated to be condensed in a condenser 17 by means of cold water circulating from a cooling tower 18 or any other source through a circulation pump 19. The steam loses its pressure as well as its temperature and is converted back to water.

The condensed water is brought back to the boiler by a water feed pump 20. A part of the water can be lost during the cycle, which is appropriately fed by a complementary external water source A-2 treated in a purification and softening station 21.

The solid combustion byproducts, i.e., the metal oxides (and in the present embodiment the iron oxide), are recovered in two places, i.e., at the bottom of the boiler 22 and in the electrostatic filter. These metal oxides can be stored for an indefinite duration in order to be eventually used to absorb energy by transforming back into metal powder with electricity. As an example, iron oxide can be transported to a fuel production station 23 (such as the metal powder production module 309 of FIG. 3) where it will be reduced to iron powder. In some embodiments, an eventual loss during combustion can be offset by an addition of iron ore A-3.

Returning to FIG. 3, the power plant 300 comprises a third transport means 323 to transport the metal oxides during process 500 to a second storage module 325. As can be appreciated, the equipment used in the third transport means 323 and the second storage module 325 can be similar to the other transport means 311, 317 and to the first storage module 315. As an example, the transport means 323 can comprise a conveyor and a stacker-reclaimer, and the second storage module 325 can comprise another silo. As can be appreciated, the metal oxides are in a more stable and less reactive state. Moreover, iron oxide is non-toxic. Therefore, it is not necessary to use the same precautions as with the transport, handling, and storage of metal powders, especially with regards to flammability. Nevertheless, certain precautions can be taken anyway since certain safety risks can always be present. For instance, any powder poses respiratory dangers and/or explosion risks. Moreover, in case of partial combustion during the production of the metal oxides, some iron can remain. This iron is at risk of producing hydrogen if it enters into contact with water/humidity. Precautions can therefore be taken during transport, handling, and storage of metal oxides to lessen these risks.

When power plant 300 is in electricity storage mode, a fourth transport means 327 can be used to handle and transport metal oxide towards the metal powder production module 309 and/or towards the preparation and conditioning module 307 where the metal oxide can be stored temporarily in preparation for the metallic fuel production process 400. Once again, the equipment used in the fourth transport means 327 can be similar to the other transport means 311, 317 and 323.

As can be appreciated, the fourth transport means 327 completes a transport circuit of the physical storage vector (the metal power and the metal oxide) between the metal powder production module 309 and the power production module 321. A global cycle is therefore completed, the cycle allowing to produce metal powders from metal oxide by absorbing energy, to produce energy by burning metal powders, and to recover the metal powders from the metal oxide by absorbing energy. Power plant 300 can therefore be considered as a black box comprising all the processes required to implement a global process of bidirectional transformation between electricity and metal powder. In other words, plant 300 can recover its own metal fuel from its combustion residues.

In some embodiments, it may be necessary to add metal oxide and/or metal powders in power plant 300, for instance to compensate for losses of solids that can occur during metal powder combustion, and/or during metal powder recovery (as an example, if the metal powder recovery is performed by direct reduction of iron oxides by hydrogen). Addition of metal oxide and/or metal powders is also necessary to start the first cycle of plant 300 or to raise the capacity of plant 300 to absorb and/or produce electricity. As can be appreciated, addition can be performed in different ways. As an example, as illustrated in FIG. 3, complementary metal oxide 329 can be transported from an external site, conditioned, and introduced into second storage module 325. In other embodiments, new iron oxide can be introduced directly at the leaching step of the electrolytic process 400. It can also be understood that metal oxide can be replaced by new, "fresh" oxide from an external site, for instance if the metal oxide in plant 300 has degraded through many years of use. The addition and/or replacement of metal powders could also be performed in a similar way.

In an embodiment, all the equipment required to implement the electricity absorption and production cycle (such as the transportation means 311, 317, 323, 327, the storage modules 315, 325 the transformer modules 309, 321, as well as all accessory modules) can substantially be powered by a common energy source. For instance, all the equipment can be powered by power plant 300, by a local electric circuit of plant 300 (for instance an LV circuit), by a common electrical grid (for instance an HV grid) and/or supported by other energy sources, such as a generator for startup. In some embodiments, at least the metal powder production module and the power production module are both connected to the same electrical grid. In this fashion, plant 300 can operate in a substantially self-sufficient manner, without requiring external energy or other contributions. The power plant can therefore absorb and produce energy on demand in a substantially renewable and autonomous manner.

While an exemplary configuration of power plant 300 was described above to absorb and provide electricity to an electrical grid 200, it is appreciated that different configurations of plant 300 and its modules are possible to incorporate the plant in various electrical grid configurations. Some exemplary configurations are illustrated in FIGS. 6A to 6D, but it is appreciated that other configurations are also possible.

Figure 6A:
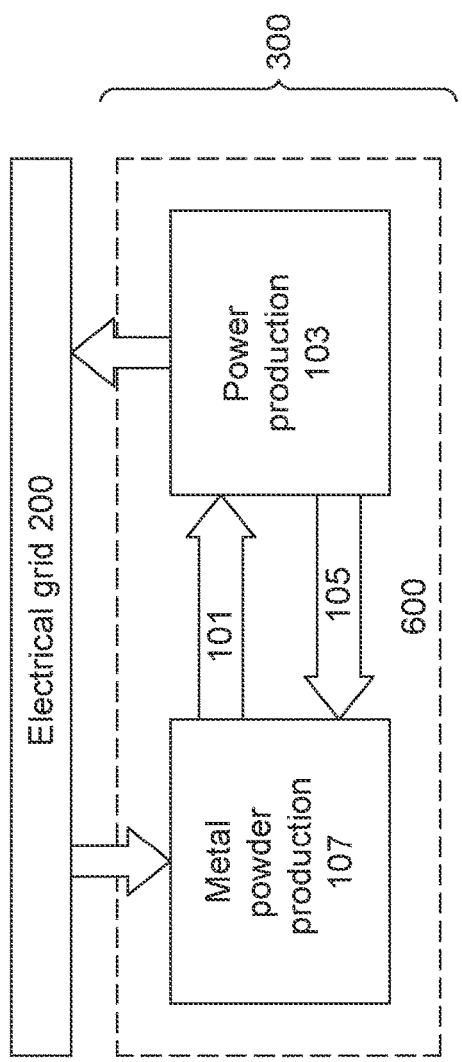
FIGS. 6A to 6D are schematics showing exemplary configurations of a power plant connected to one or two electrical grids.

In a first configuration illustrated in FIG. 6A, power plant 300 is configured to absorb and provide energy to the same electrical grid 200. The power production module 103 and the metal powder production module 107 are physically located on a common site 600. This common site 600 can correspond to a common worksite (which, as an example, can comprise one or more facilities, buildings, etc.), to a common geographical region (such as a municipality, city, etc.), and/or to any place where modules 103 and 107 are located in the same country or territory, for instance at less than 10 km from one another, or even at less than 50 km from one another. In this configuration, the plant 300 can be used to balance the power of global electrical grid 200 for instance during seasonal fluctuations.

Figure 6B:
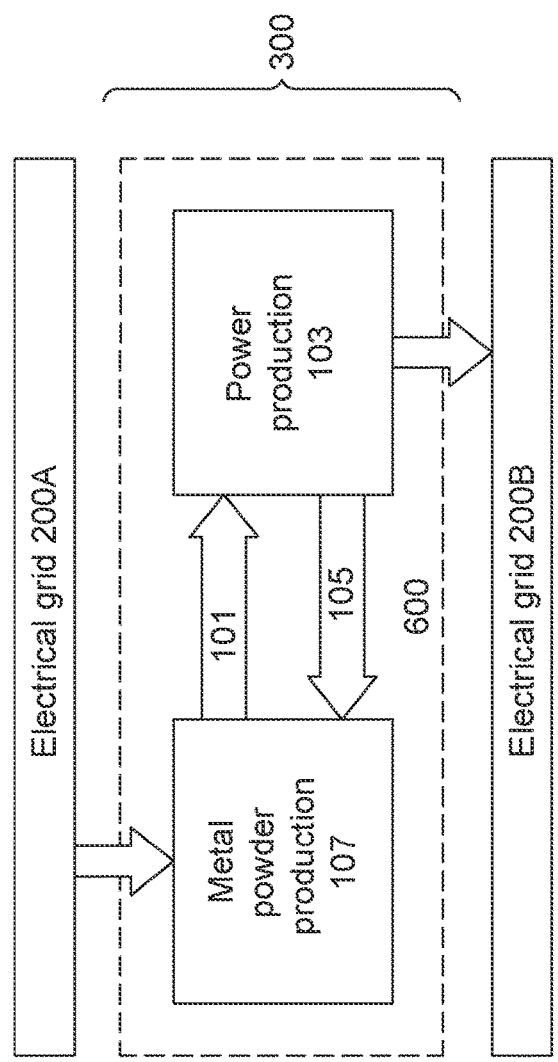

In a second configuration illustrated in FIG. 6B, power plant 300 is configured to absorb energy from a first electrical grid 200A, and to provide energy to a second electrical grid 200B which is different than the first grid 200A. The power production module 103 and the metal powder production module 107 are physically located on a common site 600. This common site 600 can correspond to a common worksite (which, as an example, can include one or more facilities, buildings, etc.), to a common geographical region (such as a municipality, city, etc.), and/or to any place where modules 103 and 107 are located in the same country or territory, for instance at less than 100 km from one another, or even at less than 50 km from one another. The modules 103 and 107 can be located, for instance, near a border between the two electrical grids 200A and 200B. In some configurations, the two grids 200A and 200B can be grids of a same country, territory, domain, municipality, city, etc. In other configurations, the two grids 200A and 200B can be grids of different countries, territories, domains, municipalities, cities, etc. These two grids can be owned and/or operated by the same owner or operator, or by different owners or operators.

Figure 6C:
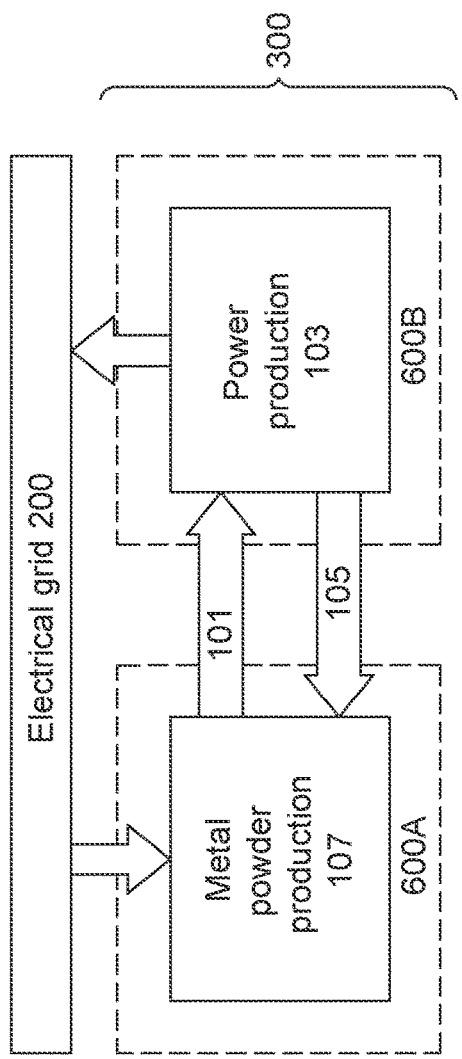

In a third configuration illustrated in FIG. 6C, power plant 300 is configured to absorb and provide energy to the same electrical grid 200. However, the power production module 103 is physically located on a first site 600A, whereas the metal powder production module is physically located on a second site 600B which is distinct from the first site 600A. These sites 600A and 600B can correspond to distinct worksites (which, as an example, can each comprise one or more facilities, buildings, etc.), to distinct geographical regions (such as different municipalities, cities, etc.), and/or to any place where modules 103 and 107 are distant from one another in the same territory (or in any region served by the same electrical grid 200), for instance in locations that are distant by more than 100 km from one another in the same territory. In this configuration, the plant 300 can be used to distribute energy over larger areas and/or at strategic locations of a same grid, for instance during seasonal fluctuations or other temporal fluctuations of grid 200. As can be appreciated, storage modules 101, 105 can be located on one or the other of sites 600A, 600B and/or at intermediary sites. It can also be appreciated that transport modules can be adapted to transport the metal oxides and powders over longer distances.

Figure 6D:
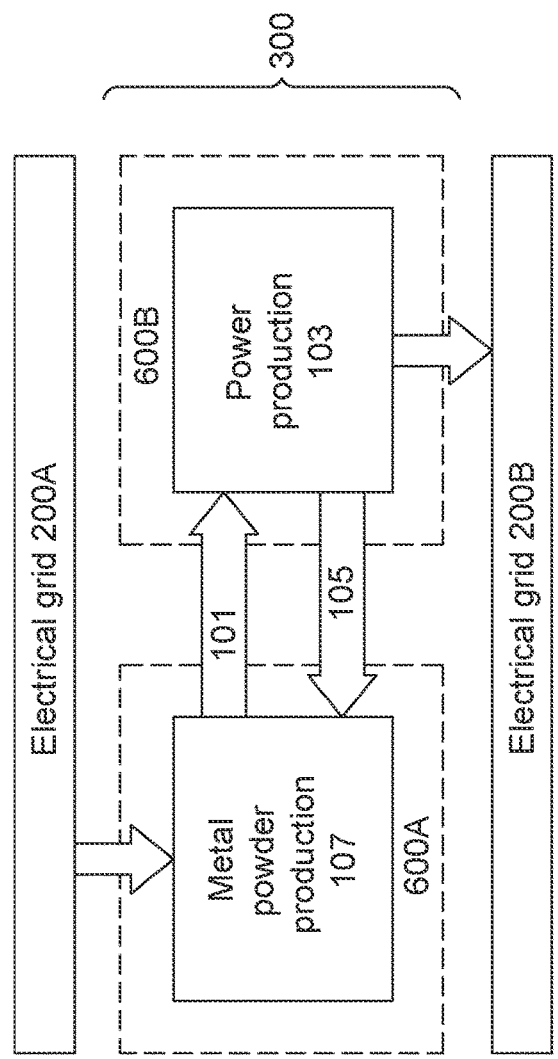

In a fourth configuration illustrated in FIG. 6D, power plant 300 is configured to absorb energy from a first electrical grid 200A, and to provide energy to a second electrical grid 200B which is different than the first grid 200A. Moreover, the power production module 103 is physically located on a first site 600A, whereas the metal powder production module is physically located on a second site 600B which is distinct from the first site 600A. These sites 600A and 600B can correspond to distinct worksites (which, as an example, can each comprise one or more facilities, buildings, etc.), to distinct geographical regions (such as different municipalities, cities, etc.), and/or to any place where modules 103 and 107 are distant from one another in the same territory (or in any region served by the same electrical grid 200), for instance in locations that are distant by more than 100 km from one another in the same territory. The modules 103 and 107 can be located, for instance, near a border between the two electrical grids 200A and 200B.

In some configurations, the two grids 200A and 200B can be grids of a same country, territory, domain, municipality, city, etc. In other configurations, the two grids 200A and 200B can be grids of different countries, territories, domains, municipalities, cities, etc. These two grids can be owned and/or operated by the same owner or operator, or by different owners or operators. As can be appreciated, storage modules 101, 105 can be located on one or the other of sites 600A, 600B and/or at intermediary sites. It can also be appreciated that transport modules can be adapted to transport the metal oxides and powders over longer distances.

As can be appreciated, the metal power plant 300 described above can have many benefits over traditional power plants. Its working principle is the conversion of electricity (energy) metal-electricity (power), which allows a complex conversion of electric energy in metallic energy, and vice versa. The metal as powder or grain is used as a physical storage vector.

The metal power plant can also convert a large quantity of metal oxide into metal powder by using electricity. The metal, irrespective of its chemical composition, always remains on location. Being in solid form, it does not require additional effort as is the case with compressing a gas, or the back pressure of a hydraulic seal of a water tank. Only the electrons, the oxygen and the metal are moving.

The metal powder can be used as fuel to power a heat cycle-based power plant. Accordingly, a metal power plant does not need to be located in a remote region. It could be installed near a center with a high-power demand or at a strategic point for a carrier. As an example, the metal could be iron which is available in great amounts in some regions of the globe. It is also possible to use other types of metals such as silicon, aluminum, ferrosilicon, magnesium, etc.

The power plant can also have a small footprint (especially by comparison with long-term pumped water storage) and can benefit from a very good possibility of raising its long-term storage capacity. The plant can therefore easily evolve to meet power needs for longer durations. The capacity to absorb power is defined by the metal power recovery aspect. The capacity to give back power is defined by the power production aspect. These two aspects of the process are relatively costly. However, the storage of iron powders and iron oxides can easily be raised for a cost much lower than the two other aspects of the process. As an example, it is sufficient to merely increase the number of silos.

Finally, the power plant can operate and/or be designated as asymmetric power capacity. The plant can have a capacity to absorb a maximal power different from its capacity to produce a maximal power. This choice can be influenced by the economic reality of the electricity market where the plant will be established, and/or by the operational reality of the electrical grids to which it will be connected, among other factors.

While certain advantages were described, a person skilled in the art will appreciate other advantages and/or properties inherent to the invention that were not described explicitly. Moreover, while certain configurations and certain embodiments were described herein, it is appreciated that they are provided as examples only and must not be understood in such a way as to limit the scope of the invention.

The invention claimed is:

1. A power plant configured to operate in a first mode wherein it supplies power to a receiving electrical grid, and in a second mode wherein it absorbs power from a source electrical grid, wherein:
    in said first mode, the plant is configured to produce electricity using metal powder as fuel;
    in said second mode, the plant is configured to store energy by using the electricity from the source electrical grid to recover the metal powder from metal oxide; and
    the receiving electrical grid and the source electrical grid are the same electrical grid.

2. The power plant according to claim 1, comprising a power production module configured to generate electricity by burning the metal powder, a metal powder production module configured to recover the metal powders from the metal oxides using electricity, and at least one transport means to transport the metal powders and the metal oxides between the power production module and the metal powder production module.

3. The power plant according to claim 2, wherein the power production module and the metal powder production module are spaced apart from one another by a distance of less than 50 km.

4. The power plant according to claim 2, comprising a first storage module to store the metal powders, and a second storage module to store the metal oxides.

5. The power plant according to claim 4, wherein at least one of the storage modules comprises an atmosphere controlled for humidity, pressure and/or gas composition.

6. The power plant according to claim 4, comprising at least one transport means to transport the metal powders and the metal oxides between the first and the second storage modules and the metal powder and power production modules.

7. The power plant according to claim 2, wherein the production modules are spaced apart from the storage modules by a distance of less than 50 km.

8. The power plant according to claim 6, wherein the receiving electrical grid and the source electrical grid operate at a first voltage, and the storage and/or transport modules are powered by a common electrical source having a second voltage that is lower than the first voltage.

9. The power plant according to claim 6, wherein the storage and/or transport modules are at least partially powered by the power production module.

10. The power plant according to claim 2, wherein the power production module is configured to drive a working fluid using the combustion heat of metal powder to operate a turbo generator unit or other heat-based engines for producing electricity.

11. The power plant according to claim 2, wherein the metal powder production module is configured to recover the metal powder by electrolysis.

12. The power plant according to claim 2, wherein the metal powder production module is configured to recover the metal powder by direct reduction of the metal oxides by hydrogen or by electrolysis in an alkaline medium.

13. A method of storing and producing electricity, comprising the following steps:
    absorbing energy from a source electrical grid by using the electricity of the source electrical grid to recover metal powder from metal oxide;
    producing energy by using the recovered metal powder as fuel; and
    supplying the produced energy to a receiving electrical grid wherein the receiving electrical grid and the source electrical grid are the same electrical grid.

14. The method according to claim 13, wherein the metal oxide produced during the combustion of the metal powder is used to subsequently absorb energy from the source electrical grid.

15. The method according to claim 13, wherein the step of absorbing energy is performed when there is an excess of energy on the source electrical grid, and the steps of producing and supplying the energy are performed when there is an insufficiency of energy on the receiving electrical grid.

16. A system for storing and producing electricity by means of metal powder, comprising:
    a power production module connected to a receiving electrical grid, the power production module being configured to produce electricity and metal oxide by the combustion of metal powder, and to supply the produced electricity to the receiving electrical grid; and
    a metal powder production module connected to a source electrical grid, the metal powder production module being configured to absorb electricity by recovering the metal powder from the metal oxide with electricity from the source electrical grid,
    wherein the receiving electrical grid and the source electrical grid are the same electrical grid.

17. The system according to claim 16, comprising at least one voltage transformer module to transform the electricity of the power production module to a voltage compatible with the receiving electrical grid, and/or to transform the electricity of the source electrical grid to a voltage compatible with the metal powder production module.

18. The system according to claim 16, wherein the voltage transformer module comprises a bidirectional voltage transformer module configured to transform a first voltage to a second voltage which is different than the first voltage, and vice versa.

19. The system according to claim 16, comprising:
    a first storage module to store the metal powders;
    a second storage module to store the metal oxides generated by the combustion of the metal power; and
    at least one transport means configured to:
    transport the metal powders from the first storage module to the power production module;
    transport the metal oxides from the power production module to the second storage module;
    transform the metal oxides from the second storage module to the metal powder production module; and
    transport the metal powders from the metal powder production module to the first storage module.

20. The power plant according to claim 1, configured to operate in a third mode in which it operates as a rotating machine to stabilize the receiving and/or source electrical grids.

* * * * *